Figure 1:
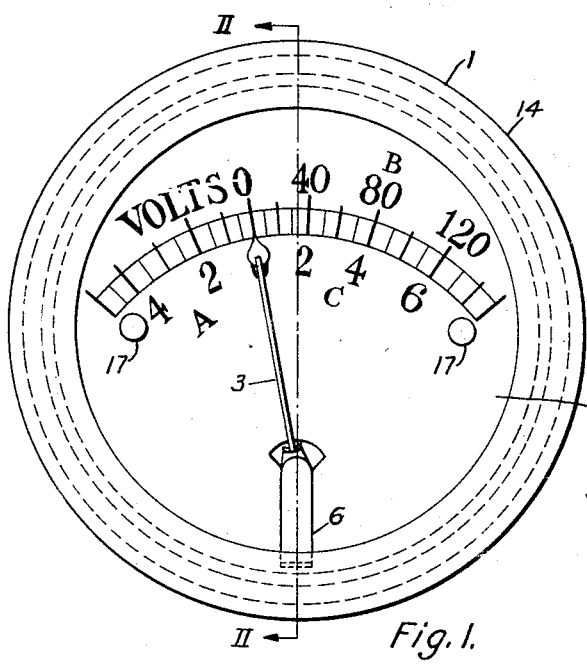

Oct. 9, 1928.  
J. W. LEGG  
1,686,669  
ELECTRICAL MEASURING INSTRUMENT  
Filed Sept. 26, 1925    2 Sheets-Sheet 1

WITNESSES:  
Fred S. Wilharm  
F. H. Miller

INVENTOR  
Joseph W. Legg  
BY  
Wesley G. Carr  
ATTORNEY

Oct. 9, 1928.

J. W. LEGG 1,686,669

ELECTRICAL MEASURING INSTRUMENT

Filed Sept. 26, 1925  2 Sheets-Sheet 2

WITNESSES:

INVENTOR
Joseph W. Legg
BY
ATTORNEY

Patented Oct. 9, 1928.

1,686,669

UNITED STATES PATENT OFFICE.

JOSEPH W. LEGG, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRICAL MEASURING INSTRUMENT.

Application filed September 26, 1925. Serial No. 58,815.

My invention relates to measuring instruments and particularly to electrical measuring instruments of the polarized-vane type.

One object of my invention is to provide an instrument, of the above-indicated character, that shall require substantially minimum current consumption for its operation.

Another object of my invention is to provide an electrical measuring instrument embodying relatively movable elements that shall move different distances in opposite directions in response to equal and opposite energization of one of the elements.

Another object of my invention is to provide an instrument that shall embody a scale having an off-center zero position and that shall represent at least one range of values in one direction and a plurality of ranges of values in the opposite direction from its zero position, together with movable indicating means for co-operation therewith.

Another object of my invention is to provide a novel means for simply, economically and accurately mounting the stationary and movable elements of a meter in relative positions.

Another object of my invention is to provide a simple and economical casing structure for an electrical measuring instrument that shall comprise parts which are definitely constructed in accordance with the electrical characteristics of the operating elements of the instrument supported thereby.

Another object of my invention is to provide an electromagnet of novel construction whereby a core member of substantially U-shape may be retained in fixed relation to a supporting structure adjacent to the pole ends thereof and that shall embody a removable section intermediate said ends for the reception of an energizing coil.

A further object of my invention is to provide an electrical measuring instrument that shall be simple and durable in construction, economical to manufacture and effective in its operation.

With such objects in view, as well as other advantages which may be incident to the utilization of the improvement, my invention consists in the parts and combinations thereof hereinafter set forth and claimed with the understanding that the several necessary elements constituting the same may be varied in proportions, texture and arrangement without departing from the nature and scope of the invention.

Heretofore, voltmeters for measuring the voltages of dry-cell or small storage battery circuits have usually been of such construction as to consume in themselves a much too great proportion of the battery current and very often taking more current during a short measurement than is taken over a relatively long period of time by the translating devices to be operated by the batteries. This condition, unknown to those not versed in electrical matters but who wish to operate such devices and may know, in a general way, that the battery voltages should be maintained above certain values for satisfactory results, sometimes drains the batteries in a relatively short time for no apparent reason.

It is one of my aims to remedy the above condition by providing an instrument that may be used freely, even by those not having much knowledge of electrical devices, and that shall require substantially minimum current for its operation.

However, other aims, as outlined in the objects stated above, are contemplated to provide an instrument of compact and economical construction, neat appearance and very effective operation.

Accordingly, in practicing my invention, I provide an instrument in which the ampere turns of the energizing-magnet are so related to the batteries from which they obtain current, in which the magnet pole ends are so constructed relative to the movable element, in which the dial is so marked, in which the parts of a two-part casing are so related to each other and to the other parts of the instrument, and in which other features are so provided as to require substantially minimum current for its operation and to otherwise obtain a highly improved instrument for the purposes for which it is adapted.

In order to make the invention more clearly understood, means are shown in the accompanying drawings for carrying the same into practical effect without limiting the improvements in these useful applications to the particular constructions which, for the purpose of explanation, are made the subject of illustration.

Figure 2:
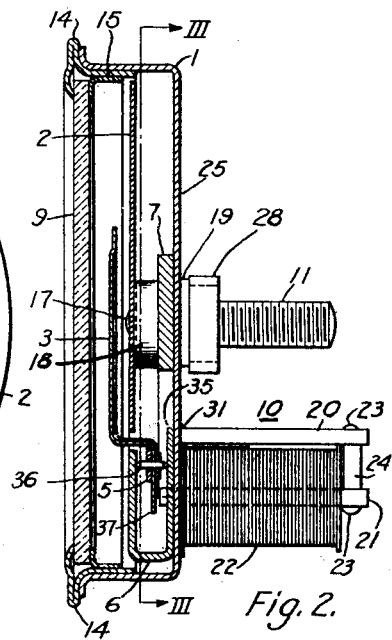
Figure 3:
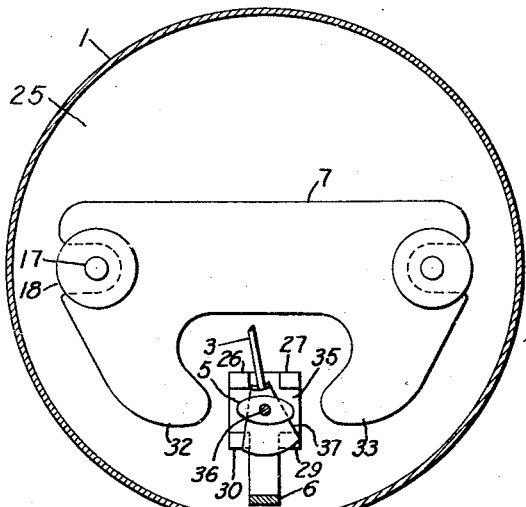
Figure 4:
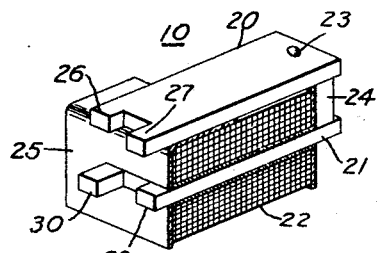
Figure 5:
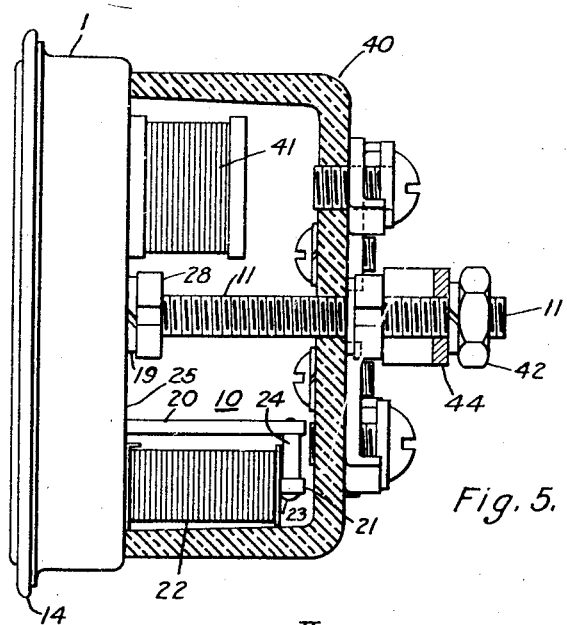
Figure 6:
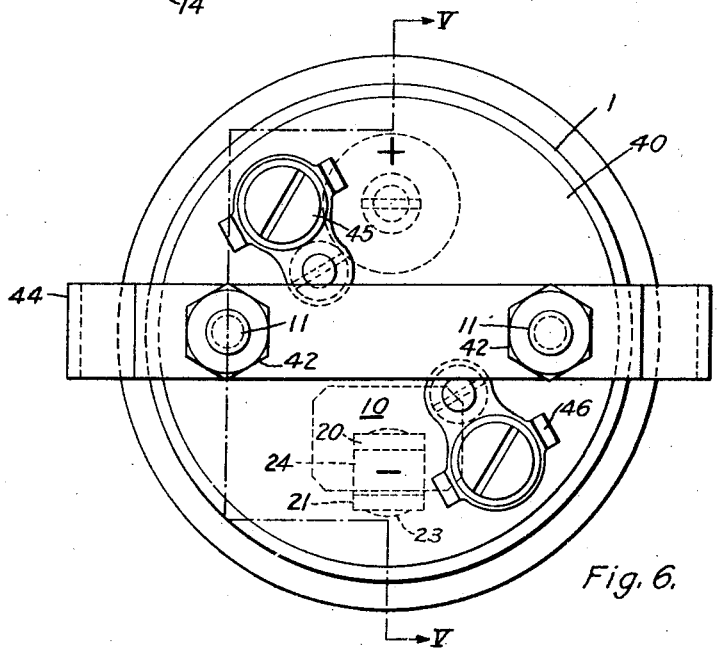

Figure 1, of the accompanying drawings, is a front or face view of an electrical measuring instrument constructed in accordance with my invention, Fig. 2 is a view taken along the line II—II of Fig. 1, Fig. 3 is a view taken along the line III—III of Fig. 2, Fig. 4 is a detail perspective view of a portion of the instrument, Fig. 5 is a view, partially in side elevation and partially in section along the line V—V of Fig. 6, of a modified form of my invention, and Fig. 6 is a rear elevation or back view of the device shown in Fig. 5.

Referring to Figs. 1 to 4, inclusive, the instrument comprises, in general, a casing 1, in which are disposed a dial plate 2, a pointer 3, a movable element or magnetizable vane 5, a movement support 6, and a permanent control magnet 7 for the vane 5, and to which casing are attached a window plate 9, an electromagnet 10 and mounting studs 11.

The casing 1 is constructed of a non-magnetic material, preferably of a single piece of relatively-thin sheet brass, to be of relatively shallow substantially cup-shape and is provided around its open-end perimeter, with an outwardly projecting integral flange. A ring member 14, press-fitted into the open end of the casing 1, and another ring member 15, press-fitted into a tubular portion of the ring 14, are provided with inwardly-projecting flange portions between which the window plate 9 is held in position.

Each stud 11 comprises a threaded shank portion, a head 18 and a projecting portion 17 integrally united to each other.

The permanent control magnet 7 is preferably constructed of relatively thin sheet formation to lie in relatively close parallel-plane relation to the rear wall of the non-magnetic casing to which it is secured by the heads 18 of the studs 11 which extend through the casing 1. The heads 18 also serve as positioning and spacing means for the dial plate 2 which is secured in position by swaging over the ends of the portions 17. The studs 11 are held in position by lock washers 19 and spanner nuts 28 thereon at the rear side of the casing 1.

The dial plate 2, constructed of material similar to that of the casing 1, is provided with an opening in which a portion of the movement support 6 is disposed and through which the pointer 3 extends, and is provided with a plural-part scale, represented by the letters A, B and C for co-operation with the pointer 3.

The zero or inoperative position of the scale is disposed eccentric to, or at one side of, the center thereof, for a purpose to be hereinafter more fully explained, and is graduated, in one direction of the pointer 3 from this zero position thereof, in accordance with at least one range of values A and, in the opposite direction from the zero position, in accordance with a plurality of ranges of values, as B—C.

The electro-magnet 10 comprises a core member of iron or iron alloy having very little residual magnetism and is of substantially U-shape embodying side portions 20 and 21, around the portion 21 of which a coil or winding 22 is disposed, and a separable end portion 24. The coil 22 may be placed around the portion 20 or be slightly modified, or the end portion 24 modified, for placing the coil around the portion 24. The latter is held in position by portions 23 extending through apertures in the members 20 and 21 and one of which may be integral with the portion 24 and the other a screw, or the portions 23 may be parts of a single integral rivet extending through the portions 20, 21 and 24.

The electromagnet 10 is secured to the non-magnetic rear wall 25 of the casing 1, as by projections 26 and 27, on the portion 20, and projections 29 and 30, on the portion 21, which extend through openings in the wall 25 and are preferably held in position by bodies of solder 31 around and between the junctures of the intercepting surfaces.

The vane 5 is of substantially ellipsoidal flat-sheet form disposed in closely parallel-plane relation to the control magnet 7 having its major or magnetic axis normally disposed at substantially right angles, or transverse, to the magnetic-field axis of the electromagnet 10 between the pole ends, or ends having the projections 26—27 and 29—30, of the portions 20 and 21 and substantially in line with the magnetic axis of the flux path between pole ends 32 and 33 of the control magnet 7.

The above-described structure, with the pole ends of the electromagnet portions 20 and 21 of equal lengths and straight, rounded or otherwise uniformly or symmetrically formed, as in the usual structures of instruments of this general type, would cause the magnetic axis of the vane to lie in a horizontal position, as viewed in Fig. 3, when the electromagnet is deenergized, and the vane 5 to deflect about its point axis equal distances for equal degrees of energization of the electromagnet 10 in opposite directions.

However, by having the projections 26 and 29 relatively short and the diagonally opposite projections 27 and 30 relatively long, the vane 5 normally lies slightly off the above-mentioned horizontal position, as shown in Fig. 3 and equal energization of the electromagnet in opposite directions by currents of relatively large magnitude deflects the vane unequal distances. More particularly, the above-described arrangement of the pole tips or projections 26, 27, 29 and 30, or one equivalent thereto, improves the operating characteristics of the device in that equal increases in the magnitude of the current traversing the coil 22 produces, over a greater range than has heretofore been possible, substantially equal deflections of the pointer 3. This result is effected due to the fact that the end of pole tip 26, for example, is removed some distance from the plane of the vane 5. Accordingly, said pole tip 26 is prevented from exercising its maximum effect on the vane 5 as it moves in a clockwise direction, Fig. 3, and as a result, the increments of vane movement are substantially uniform even though the end thereof has passed in a clockwise direction, Fig. 3, beyond the line joining the axis of said vane and the pole tip 26.

The projections 26, 27, 29 and 30 being thus, provided for a particular new principle of operation are further utilized, in a mechanical sense, for positioning the moving and stationary operating parts relative to each other to a fine degree of precision which may be effected quickly in assembling the parts. To effect this operation, the movement support 6 is constructed, preferably of non-magnetic-flat sheet metal, to be of substantially U-shape, viewed laterally, and to have a substantially cruciform end 35 which fits snugly between the projections 26, 27, 29 and 30 where it is soldered in place, as are the portions 20 and 21 and preferably at the same time.

The pointer 3 and the vane 5 are mounted on a shaft 36 which may be pointed and journalled at each end in bearing portions in the legs of the U-shaped support 6. Thus, all of the operating parts are maintained in accurate relation to each other to insure continued effective operation of the instrument. The pointer 3 may be provided with a counterbalance weight or damping member 37.

To measure very small currents I employ a relatively great number of short turns of fine wire of much lower resistance than in any instrument which, to my knowledge has similarly been employed in battery circuits.

In operation, when it is desired to measure direct-current or battery voltages, not beyond a maximum of five volts, the coil 22 is connected to a circuit by leads (not shown) to so direct the current and the flux of the electromagnet 10 as to deflect the pointer 3 to the left of its zero position along the scale A, as viewed in Fig. 1.

When it is desired to measure a similar voltage, not beyond a maximum of seven or eight volts of opposite polarity, the direction of current in the coil 22 being reversed, the pointer 3 swings over the scale C.

By providing a suitable resistor (not shown) in circuit with the coil 22 and energizing the latter in the same direction as when employing the scale C, the pointer may be caused to swing over the scale B to indicate up to a maximum of about one hundred and fifty volts, in the particular instrument shown.

The instrument is therefore extremely flexible in its adaptation to different ranges of voltages and gives very accurate readings on each range. The ordinary forms of instruments of this general type usually employ scales of equal values on either side of zero and are generally and approximately accurate, being actually employed more to indicate only the presence and direction of voltage rather than to obtain closely accurate measures of its value.

In the modification of my invention shown in Figs. 5 and 6, in which corresponding parts are designated by corresponding reference characters, the construction and operation are substantially the same as above described, except that an auxiliary insulating casing 40 of substantially cup-shape is provided with its open end against the closed end of the casing 1, whereby the non-magnetic rear wall 25 of the casing 1 constitutes an intermediate supporting wall in the composite casing of this structure, and a fine-wire resistor winding 41 is mounted in the self-contained unit. In this unit also, a pair of mounting studs 11 are extended through the rear wall of the insulating casing 40 for cooperation with nuts 42, a clip 44 and other minor elements for holding the casing 40 to the casing 1 and unit instrument, as a whole, on a panel or other support (not shown).

Terminal elements 45 and 46 are mounted on the rear wall of the insulating portion 40 of the composite or multi-part casing for connecting the coil 22 and the resistor 41 to an outside or battery circuit.

In the above-described structure, the magnetic or flux-employing operating parts are mechanically and electrically effectively mounted in the non-magnetic casing 1, to be unaffected thereby and the current-conducting terminals are mounted on the casing 40 without the requirement for additional insulation which would be necessary if the casing 40 were of metal.

Thus, a neat, compact, flexible and self-contained unit of economical construction and effective operation is provided having its parts of such texture and relation as to require them to be of substantially minimum number and of maximum simplicity.

I claim as my invention:

1. An electrical measuring instrument comprising a movable flux-responsive element, biased toward a predetermined zero position, and an actuating electromagnet therefor including a core member shaped to magnetically move said element farther from said position when energized in one direction than when equally energized in the opposite direction.

2. An electrical measuring instrument comprising a movable flux-responsive element biased toward a predetermined zero position, and an actuating electromagnet therefor including a core member, the magnetic axis between the poles of which extends transversely adjacent to the magnetic axis of the element in the de-energized condition of the magnet, the pole ends of the magnet being constructed to so affect the flux thereof as to move the element farther from said position when the magnet is energized in one direction than when it is equally energized in the opposite direction.

3. An electrical measuring instrument comprising a movable flux-responsive element biased toward a predetermined zero position, and an actuating electromagnet therefor including a core member, the magnetic axis between the poles of which extends transversely adjacent to the magnetic axis of the element in the de-energized condition of the magnet, one of the pole ends of the magnet being shaped to deflect the flux laterally from its normal axis for effecting movement of the element farther from said position when the magnet is energized in one direction than when it is equally energized in the opposite direction.

4. An electrical measuring instrument comprising relatively movable flux-exchanging elements biased toward a zero relative position in which the flux axes thereof are angularly related, one of said elements including a magnetizable member having a pole end portion shaped to so affect the flux between the elements as to cause the same to move relatively a greater distance from said zero position when one of the elements is energized in one direction than when it is equally energized in the opposite direction.

5. An electrical measuring instrument comprising a movable flux-responsive element biased toward a predetermined zero position, and an actuating electromagnet therefor including a core member the magnetic axis between the poles of which extends transversely adjacent to the magnetic axis of the element in the deenergized condition of the magnet, the pole ends of the core member each having projecting portions of different lengths for effecting movement of the element a greater distance from said position when the magnet is energized in one direction than when it is equally energized in the opposite direction.

6. A measuring instrument comprising a scale having an eccentric zero position thereon, the scale being marked in one direction from said position to represent one range of values and in the opposite direction from said position to represent a plurality of ranges of values, and movable indicating means for co-operation with the scale in accordance with values of each of said ranges.

7. An electrical measuring instrument comprising a movable element, a field-magnet core member therefor and a bearing support for the element projecting from an end of the core member and having a portion fitting said end.

8. An electrical measuring instrument comprising a movable element, a field-magnet core member therefor having pole ends providing quadrature-related rectangular projections and a bearing support for the elements of substantially U-shape having one end substantially cruciform fitting the adjacent inner faces of said projections.

9. An electrical measuring instrument comprising a non-magnetic supporting wall, a movable element at one side of said wall, a field-magnet core member at the other side of said wall having a pole portion extending therethrough and a bearing support for the element at said other side having a portion fitting said pole portion.

10. An electrical measuring instrument comprising a casing embodying front and rear members of substantially cup shape, the closed end of one being disposed in contacting relation with the open end of the other whereby said closed end constitutes an intermediate wall of the casing, said front member being of relatively-thin non-magnetic metal, magnetic-flux operated and operating elements supported on the respective sides of said non-magnetic intermediate wall, said rear member being of insulating material, and conducting terminals of the instrument supported on said insulating rear member.

11. The combination with an oscillatory magnetizable member biased to a selected position, of electromagnetic means comprising a pole tip with respect to which one end of said member is movable, said pole tip, in response to equal increases in the magnitude of the current traversing said electromagnetic means, controlling movement of said member by substantially equal increments after said one end of said member has moved from said position to a region beyond a line passing through the axis of said member and said pole tip.

12. The combination with an oscillatory magnetizable member biased to a selected position, of electromagnetic means comprising a plurality of spaced pole tips with respect to which one end of said member is movable, the distances between said one end of said member and the respective pole tips being different when the longitudinal axis of said member coincides, respectively, with the lines passing through the axis thereof and said pole tips.

13. The combination with an oscillatory magetizable member biased to a selected position, of electromagnetic means comprising a plurality of spaced pole tips with respect to which one end of said member is movable, the ends of said pole tips being spaced different distances from the plane of said member.

In testimony whereof, I have hereunto subscribed my name, this first day of September, 1925.

JOSEPH W. LEGG.